UNITED STATES PATENT OFFICE.

WALTER G. CLARK, OF NEW YORK, N. Y., ASSIGNOR TO PARKER-CLARK ELECTRIC COMPANY, OF NEW YORK, N. Y., A CORPORATION OF NEW JERSEY.

PROCESS OF MAKING INCANDESCENT-LAMP FILAMENTS.

No. 876,332.      Specification of Letters Patent.      Patented Jan. 14, 1908.

Application filed January 14, 1907. Serial No. 352,106.

*To all whom it may concern:*

Be it known that I, WALTER G. CLARK, of the city, county, and State of New York, have invented a new and Improved Process of Making Incandescent-Lamp Filaments, of which the following is a full, clear, and exact description.

My invention relates to improvements in the process of treating filaments for incandescent electric lamps, and especially for making filaments which contain a combination of silicon and carbon. Such filaments are usually made by the decomposition of volatile chlorids of silicon by means of heat, in an atmosphere of hydrogen and hydrocarbon gas, to bring about the ready decomposition of the chlorids, and to cause the silicon to be deposited in the proper form upon a conducting base. Usually this is obtained by heating to incandescence a carbon filament by passing an electric current through it, while the said filament is in an atmosphere such as described, and in the presence of some volatile chlorid of silicon or silicon in some volatile form such as tetra chlorid of silicon. The difficulty in this process, however, is that the chlorin as it is freed from the chlorid, has a tendency to re-combine with the silicon.

The object of my invention is to remove this difficulty, and I do this by including in the atmosphere of the filament which is being treated, some substance which will enter into combination with either free chlorin or hydrochloric acid gas formed by the combination of the hydrogen contained in the atmosphere in which the reaction takes place, and the chlorin freed by the decomposition of the chlorids. This reagent may be mercury, metallic sodium, potassium olefiant gas, or other mineral or gaseous substances which will readily enter into combination with the chlorin or hydro-chloric acid gas without freeing any oxygen or other material which might, or which would be liable to enter into combination with the silicon and carbon when combined, or with either silicon or carbon as the latter were on the point of combining. If mercury is used as an absorbent it must be vaporized and heated to render it sufficiently active to readily combine with the chlorin or hydro-chloric acid freed by the process.

I have found that mercury is well suited to the above requirements, as also is olefiant gas, but it will be seen that the invention lies in having the combination of silicon and carbon deposited on the conducting base, in the presence of some material or substance which has a greater affinity for chlorin or hydro-chloric acid gas, than has either silicon or carbon, or combined silicon and carbon, the result being a deposit on the carbon base which is a compound or mixture of silicon and carbon containing a high percentage of carbon. As the deposition proceeds the deposit shows more of the properties of silicon indicating that the percentage of silicon has increased. This is carried on until the surface shows strong silicon characteristics which may be determined by an oxidization method or by dissolving the surface in hydro-fluoric acid.

In carrying out the process, I inclose a carbon base in the form of a filament, in a suitable receiver, and heat the base to incandescence by passing an electric current through it. This is done in an atmosphere containing silicon chlorid, such as tetra chlorid of silicon and a gas which contains carbon. The hydro-carbon gas used may be some form of illuminating gas but it is preferably marsh gas. A little mercury, olefiant gas, or some other substance which has a greater affinity for chlorin or hydrochloric acid gas than has either silicon, carbon, or a combination of silicon and carbon, is introduced into the receiver in which the heating takes place, and when the current is passed through the filament, the chlorid of silicon is decomposed and unites with the carbon in the form of a deposit on the filament, and this deposit can be nicely regulated, as the freed chlorin combines with the mercury, sodium, olefiant gas, or other material direct, or unites with the hydrogen, forming HCl, which in turn unites with the mercury or other reagent, and so does not reunite with the silicon or combination of carbon and silicon, simply because the mercury or other substance has a greater affinity for chlorin and HCl, than has the silicon or combination of silicon and carbon. As the deposition takes place, the silicon and combination of silicon and carbon, which is a dense non-porous combination, enters the pores of the carbon base, combines with the said base, and builds up thereon, so that the base has become a combination of silicon and carbon, and my experience has shown that this gradually merges near the surface into a substance having the characteristics of silicon.

The combination of silicon and carbon deposited on the filament is rich in silicon but I have not yet determined by analysis just the formula of the combination and do not limit myself to any particular formula.

Having thus fully described my invention, I claim as new and desire to secure by Letters Patent:—

1. The herein described method of making electric lamp filaments, which consists in heating a carbon filament base in the presence of a volatile carbonaceous compound, a volatile silicon compound containing chlorin, and a substance having a greater affinity for chlorin than has silicon or the combination of silicon and carbon.

2. The herein described process of making incandescent electric lamp filaments, which consists in passing a current through a filament in the presence of a volatile compound containing carbon and a volatile compound containing silicon and chlorin, and also in the presence of a substance having a greater affinity for chlorin than has the silicon or combination of silicon and carbon.

WALTER G. CLARK.

Witnesses:
 WARREN B. HUTCHINSON,
 FRANK L. STUBBS.